E. MAURER AND G. WERNLI.
MACHINE FOR GRATING, MASHING, AND PRESSING FRUITS.
APPLICATION FILED JUNE 27, 1921.
1,413,866. Patented Apr. 25, 1922.
2 SHEETS—SHEET 1.
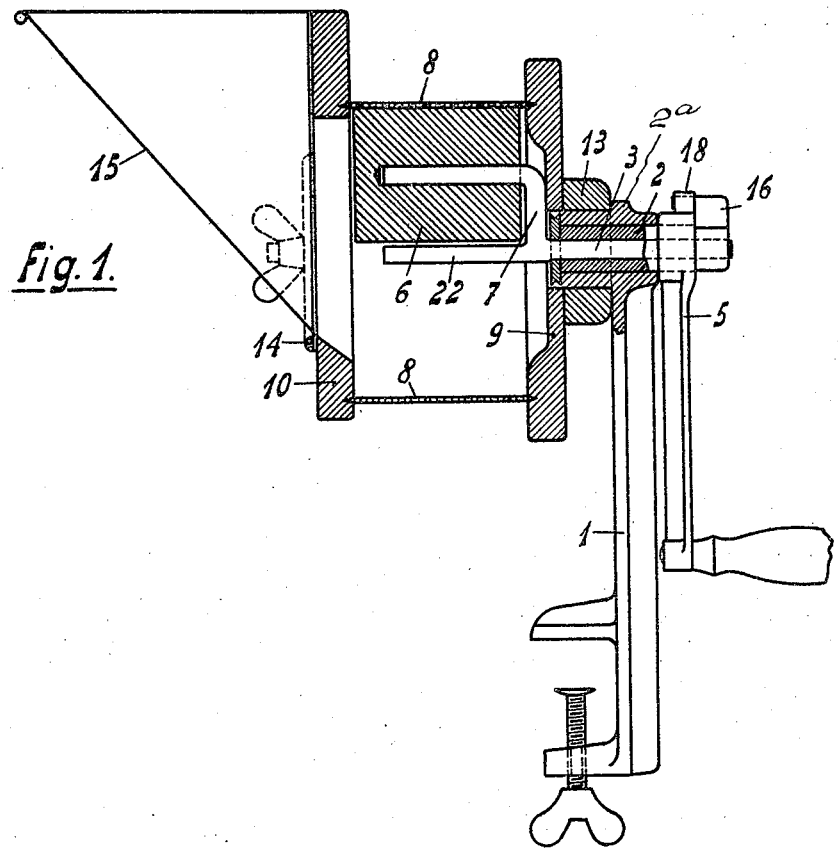

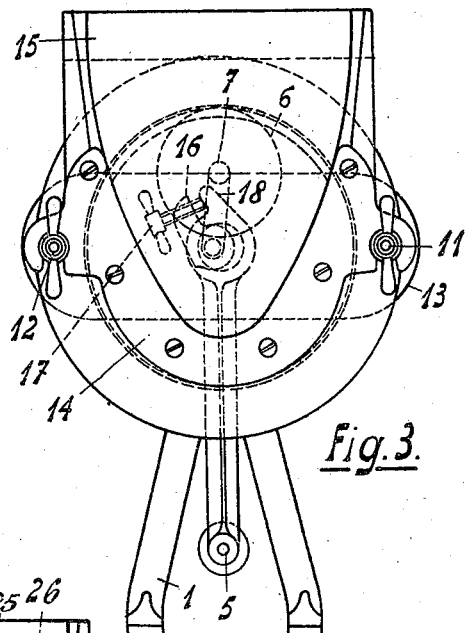
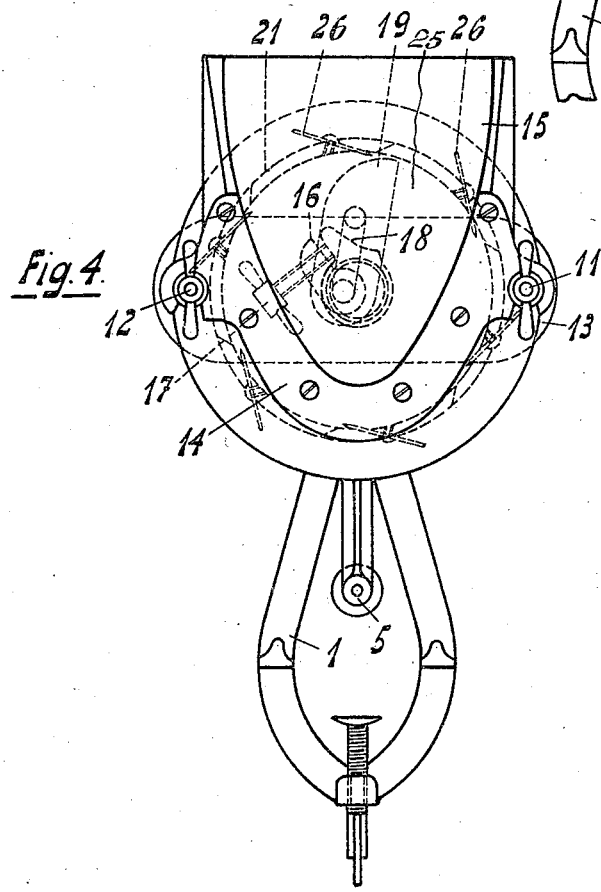

UNITED STATES PATENT OFFICE.

EMIL MAURER AND GUSTAV WERNLI, OF AARAU, SWITZERLAND.

MACHINE FOR GRATING, MASHING, AND PRESSING FRUITS.

1,413,866.  Specification of Letters Patent.  Patented Apr. 25, 1922.

Application filed June 27, 1921. Serial No. 480,849.

*To all whom it may concern:*

Be it known that we, EMIL MAURER and GUSTAV WERNLI, mechanicians, citizens of the Swiss Confederation, both residing at Aarau, Switzerland, have invented new and useful Improvements in Machines for Grating, Mashing, and Pressing Fruits, (for which we have filed an application in Switzerland dated June 23, 1920,) of which the following is a specification.

The invention relates to a new and improved machine for grating, straining, mashing, shredding, squeezing and mincing food such as fruits, bread, potatoes, cheese, almonds and so on.

One object of the invention is to provide a machine which may be used for and may be adapted to multiple purposes by changing some elements thereof.

Other objects of the invention relate to the provision of minor parts and in the manner of their cooperation and to details of construction, all of which will be more clearly set forth in the following specification.

With the above objects in view the invention resides in the parts and combinations of parts hereinafter described and particularly set forth in the claims appended hereto.

In the accompanying drawings one mode of construction is shown by way of an example.

Fig. 1 is a sectional elevation on line A—B of Fig. 2 of the machine as used for squeezing and mashing fruits.

Fig. 2 is a top view and

Fig. 3 a front view thereof.

Fig. 4 illustrates the same machine as used for grating, slicing, etc.

The machine shown comprises a support 1 adapted to be fastened to a table by means of a clamp screw in the well known manner. The upper end of the support is provided with a bearing $2^a$ in which a sleeve 2 is rotatably mounted. The sleeve 2 has an eccentric bore and forms the bearing of a spindle 3. One end of the spindle 3 is bifurcated and on the other end of the spindle a cross piece 16 is rigidly fixed in which a thumb-screw 17 is arranged. The free end of the said screw 17 abuts on a nose 18 forming part of a crank 5 rigidly fixed to the sleeve 2. On the sleeve 2 a cross piece 13 is fixed carrying a circular wooden disk 9. Between the disk 9 and a second circular wooden disk 10 a perforated ring 8 of noncorrodible metal is arranged. Said ring 8 engages grooves 21 of the disks 9, 10 and is concentric to the bore of the bearing $2^a$. The disk 10 is provided with an opening 23 and with a feed hopper 15 of sheet metal. The parts 15, 13, 10, 8 and 9 are held assembled in the position shown by means of a clamping piece 14 and two screw threaded bolts 11, 12 passing through bores of the cross piece 13 and engaging eyes of the piece 14, each bolt being provided with a thumb-nut by means of which the ring 8 is firmly pressed into the grooves 21. On one of the prongs 7 of the spindle 3 a roller 6 of wood is rotatably mounted. The roller 6 runs on the rim 8 and it may be pressed thereon by setting the screw 17. If the latter is turned in any way a radial displacement of the spindle 3 takes place the bore of the sleeve 2 in which the spindle 3 is journalled being eccentrically arranged therein.

The goods for instance berries are introduced by the hopper 15 into the ring 8 and by rotating the crank 5 the fruits are pressed, the liquid passing through the perforations of the ring 8. The second prong 22 removes parts adhering to the roller 6. The ring 8 may be readily exchanged by another ring with any desired size of holes etc.

In Fig. 4 the machine is shown with a ring 25 in which a number of knives 26 are mounted. On the two prongs 7, 22 of the spindle 3 a press piece 19 is mounted the end of which passes in proximity to the knife edges. The piece 19 may be adjusted by means of the screw 17. The knives 26 project through slots in the ring 21 they are set tangentially in such a manner that they slice and cut the goods in pieces which are pressed against them by the piece 19. The machine according to Fig. 4 is used for slicing, grating, etc., of bread, cheese, etc.

What we wish to secure by U. S. Letters Patent is:—

1. Machine for grating, mashing, pressing, etc. of fruits, food, etc. comprising in combination a support, a crank-actuated spindle journalled in said support, a ring mounted on said support, a body mounted on said spindle co-operating with said ring to reduce and press the goods, means to adjust the said body with reference to said ring, means to feed the goods into said ring.

2. Machine for grating, mashing, pressing, etc. of fruits, food, etc. comprising in combination a support, a crank-actuated spindle journalled in said support, a ring mounted on said support, a body mounted on said spindle co-operating with said ring to reduce and press the goods, a sleeve to which said crank is fastened rotatably mounted in said support, the bore of said sleeve being eccentrically arranged in said sleeve and forming the bearing of said spindle, a cranked-off portion of the spindle within the ring, a roller mounted on said crank, means to rotate and set the spindle within the sleeve, means to feed said goods into the ring substantially as shown and for the purpose set forth.

In witness whereof we affix our signatures.

EMIL MAURER.
GUSTAV WERNLI.